Dec. 8, 1942.                C. R. FAELTEN                2,304,632
                        WRINKLED SURFACE ARTICLE
                          Filed Oct. 24, 1939
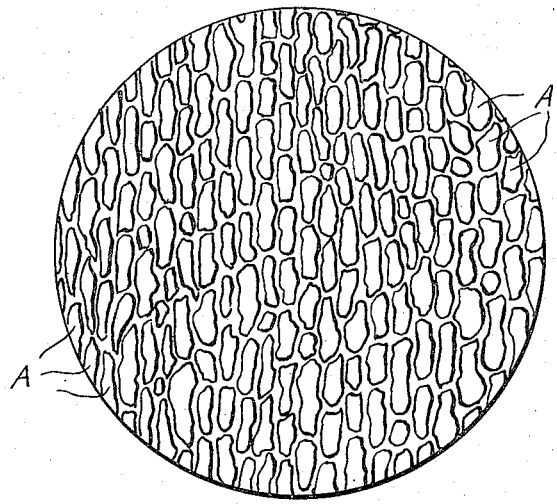
INVENTOR
Carl R. Faelten
BY
Pennie, Davis, Marvin & Edmonds
ATTORNEYS Patented Dec. 8, 1942

2,304,632

UNITED STATES PATENT OFFICE 2,304,632

WRINKLED SURFACE ARTICLE

Carl Robert Faelten, Caldwell, N. J., assignor to Flood & Conklin Mfg. Co., Newark, N. J., a corporation of New Jersey Application October 24, 1939, Serial No. 301,090

1 Claim. (Cl. 41—41)

This invention relates to the production of cellulose acetate and polystyrene products having a knurled or pebbled, more or less wavy, surface. The invention includes molded cellulose acetate and polystyrene products having such a surface, as well as methods of producing them.

In accordance with the present invention, articles made from cellulose acetate or polystyrene by injection molding, that is, by the processes in which the molten plastic is introduced into molds and hardened therein, are given a knurled or pebbled, more or less wavy, surface by treatment with an active solvent for the plastic. In carrying out the process, the liquid solvent is simply applied to the surface of the molded piece, either by dipping the piece in the solvent, spraying the solvent on the surface, applying the solvent by means of a roll, or a brush, or in other ways and then permitting the solvent to evaporate.

The surfaces of the molded plastic articles so treated are knurled or pebbled, the solvent causing the formation of small, more or less irregularly rectangular shaped ridges irregularly disposed over the surface, with recessions between them, the ridges formed being generally more or less parallel, and producing what may be called a waved surface.

The appearance sometimes taken by surfaces so treated is illustrated, more or less diagrammatically, in the attached drawing, in which is shown, on a greatly magnified scale, a typical surface having a series of ridges or protuberances A more or less irregular in contour, with depressions between them.

The treatment does not destroy the typically glossy finish of the injection molded articles, although it does, or may, eliminate to some extent the requirement of the use of highly polished molds, as minute irregularities or scratches in the mold surfaces, highly objectionable where a smooth-finished article is produced, may not be so objectionable if the article is, after molding, subjected to the process herein described, because small defects which would be highly objectionable in a highly polished surface are not so objectionable where the surface has the knurled or pebbled finish of the articles of the present invention.

The ridges or protuberances produced on the surface of the treated article are quite small and, taken across the short dimension of the generally parallel rectangles, may be around 1/75 or 1/100 of an inch, so that if the ridges or protuberances be regarded as a series of more or less parallel waves or wrinkles across the surface of the article, there may be around 75 or 100 such waves or wrinkles per lineal inch of surface. However, the size of the ridges or protuberances will vary, depending upon the solvent used and the amount of solvent used or the extent or exposure of the surface to the solvent action, the more active the solvent, or the more lengthy the time of exposure, the greater the size of the ridges and the recessions.

Various solvents may be used to carry out the process of the invention and produce the new articles having the knurled or pebbled surface. Among the solvents which may be used with advantage, and which give a very desirable surface to injection molded cellulose acetate articles are acetone, methyl ethyl ketone, isophorone, methyl acetate, ethyl acetate, methyl cellosolve acetate, methyl cellosolve and carbitol. Among the solvents which may be used with advantage to give a very desirable surface to injection molded polystyrene articles are methyl ethyl ketone, isophorone, methyl acetate, ethyl acetate and butyl acetate. These solvents will produce an attractive, continuous knurled or pebbled surface on such articles made by injection molding by simple application of the solvent to the surface with subsequent evaporation of the solvent. The articles may be dipped in the solvent, or the solvent may be sprayed upon the articles, or applied to the articles by means of a brush or cloth or the like, or by means of rollers, etc., and after application, the solvent is simply allowed to evaporate from the surface of the article.

The surfaces, after application of the solvent and its evaporation, remain hard and tough and similar in physical properties to the surface of the molded piece before the solvent treatment, but with the new configuration.

Articles produced in accordance with the invention have a surface which is very easy to grasp, without the tendency to slip manifested by highly polished, injection molded plastic articles, and such products as combs, pencils, fountain pens, knobs, handles, vanity cases, and the like, are advantageously treated, as the process is very inexpensive and produces an attractive finish on the articles at very low cost.

The cellulose acetate and polystyrene plastics used in producing the articles treated in accordance with the present invention are the usual plastics used for producing such molded articles, containing the usual plasticizers or modifying agents, as is well understood in the art.

I claim:

The process of producing injection molded articles made from a plastic selected from the class consisting of cellulose acetate and polystyrene with a knurled or pebbled surface which comprises wetting the surface of the article with a solvent for the plastic and permitting it to evaporate.

CARL ROBERT FAELTEN.